(12) United States Patent
Vankayala et al.

(10) Patent No.: US 11,798,037 B1
(45) Date of Patent: Oct. 24, 2023

(54) METHODS AND SYSTEMS FOR CREATING AUDIENCE SEGMENTS

(71) Applicant: CustomerLabs, Inc., Middletown, DE (US)

(72) Inventors: Vishnu Vankayala, Chennai (IN); Vishnu Prasad, Chennai (IN)

(73) Assignee: CustomerLabs, Inc., Chennai (IN)

( * ) Notice: Subject to any disclaimer, the term of this patent is extended or adjusted under 35 U.S.C. 154(b) by 0 days.

(21) Appl. No.: 17/657,610

(22) Filed: Mar. 31, 2022

(51) Int. Cl.
*G06Q 30/0251* (2023.01)
(52) U.S. Cl.
CPC ............................. *G06Q 30/0269* (2013.01)
(58) Field of Classification Search
CPC ....................................... G06Q 30/0207–0277
USPC ...................................................... 705/14.66
See application file for complete search history.

(56) References Cited

U.S. PATENT DOCUMENTS

| | | | | |
|---|---|---|---|---|
| 6,035,281 | A * | 3/2000 | Crosskey | H04L 67/535 705/40 |
| 10,417,660 | B2 * | 9/2019 | Hicken | G06Q 30/0261 |
| 10,706,442 | B2 * | 7/2020 | Feng | G06Q 30/0277 |
| 10,970,741 | B2 | 4/2021 | Strutton et al. | |
| 11,209,971 | B1 | 12/2021 | Pettit et al. | |
| 2005/0165643 | A1 * | 7/2005 | Wilson | H04L 69/329 705/14.66 |
| 2005/0246736 | A1 | 11/2005 | Beyda | |
| 2006/0224447 | A1 | 10/2006 | Konigstein | |
| 2008/0270234 | A1 * | 10/2008 | Flake | G06Q 30/0207 705/14.1 |
| 2010/0257040 | A1 * | 10/2010 | Hunt | G06Q 30/02 705/14.23 |
| 2011/0099076 | A1 * | 4/2011 | Repas | G06Q 30/0273 705/14.69 |
| 2012/0259851 | A1 * | 10/2012 | Jia | G06Q 30/0242 707/E17.089 |
| 2014/0280105 | A1 * | 9/2014 | Resende | G06F 16/2477 707/725 |

(Continued)

OTHER PUBLICATIONS

PC Mag Encyclopedia, HTTP, internet archive way back machine capture date of Aug. 30, 2020 from URL https://www.pcmag.com/encyclopedia/term/http, internet archive way back machine, 2020 (Year: 2020).*

(Continued)

*Primary Examiner* — Tarek Elchanti
(74) *Attorney, Agent, or Firm* — Mertzlufft Law PLLC; Joshua D. Mertzlufft (57) ABSTRACT

Advertising audience segment creators, including methods, systems, and apparatuses for automated creation of audience segments in advertising platforms are disclosed herein. Data may be received at a processor of an application server from a remote device. The data may be related to a user of the remote device. An audience member may be retrieved from an audience database. The audience member may correspond to an external identifier of the user. The audience database may be stored on an electronic storage device. The audience member may be assigned to an event. The assigning of the audience member to the event may be based on the data. Assigning the audience member to the event may be based on a refresh interval. The refresh interval may be of an audience segment. The audience segment may be refreshed. The event may be synchronized with an external advertising platform.

17 Claims, 5 Drawing Sheets

(56) References Cited

U.S. PATENT DOCUMENTS

| | | | | |
|---|---|---|---|---|
| 2015/0150033 A1* | 5/2015 | Law | ................ | H04N 21/44204 |
| | | | | 725/14 |
| 2015/0235263 A1* | 8/2015 | Bodz | .................. | H04L 67/1001 |
| | | | | 705/14.53 |
| 2016/0140587 A1* | 5/2016 | Wilson | ............... | G06F 16/2291 |
| | | | | 705/7.33 |
| 2016/0358206 A1* | 12/2016 | Sachdev | ............ | G06Q 30/0255 |
| 2017/0351733 A1 | 12/2017 | Zhou et al. | | |
| 2018/0158099 A1 | 6/2018 | Ford et al. | | |
| 2019/0073698 A1* | 3/2019 | Pearson | ............ | G06Q 30/0277 |

OTHER PUBLICATIONS

Alikeaudience, Five Audience Segmentation Strategies for Agencies & Marketers to Get the Most Out of Programmatic Advertising, 2021 (Year: 2021).*

International Searching Authority (Patent Cooperation Treaty), International Search Report and Written Opinion of the International Searching Authority (dated Jun. 23, 2023).

\* cited by examiner

METHODS AND SYSTEMS FOR CREATING AUDIENCE SEGMENTS

BACKGROUND

Advertisers may try to engage customers in various advertising platforms, for example, to build awareness of a product or service or brand to engage past, current, and potential customers. Entities such as advertisers, marketers (e.g., digital marketers), businesses, and individuals seeking to engage in digital advertising may require the presence of audience data in advertising platforms. To create audiences in such advertising platforms based on first-party data of users, advertisers may need to share audience segments with the advertising platforms. Nonetheless, when advertisers upload the data relating to their audiences, match rates may be poor. Advertisers may further face the problem of having to enter the same or similar data in different systems. Furthermore, analytics for such entities using multiple systems for advertising may suffer from a lack of timeliness and accuracy due to the various data entry needs.

Therefore, improved audience matching mechanisms are needed.

SUMMARY

This Summary is intended to introduce, in an abbreviated form, various topics to be elaborated upon below in the Detailed Description. This Summary is not intended to identify key or essential aspects of the claimed invention. This Summary is similarly not intended for use as an aid in determining the scope of the claims.

Embodiments disclosed herein may include methods, systems, and apparatuses for creation of audience segments in advertising platforms.

In an aspect, a method may comprise receiving, at a processor of an application server, data from a remote device, the data related to a user of the remote device. The method may further comprise retrieving, using the processor, an audience member corresponding to an external identifier of the user from an audience database stored on an electronic storage device. The electronic storage device may be in electronic communication with the processor. The method may further comprise assigning, using the processor, the audience member to an event based on the data and a refresh interval of an audience segment. The method may further comprise refreshing, using the processor, the audience segment. The method may further comprise synchronizing, using the processor, the event with an external advertising platform.

A system may comprise a processor of an application server. The system may comprise an electronic storage device. The electronic storage device may be in electronic communication with the processor. The electronic storage device may have an audience database stored thereon. The processor may be configured to receive data from a remote device, the data related to a user of the remote device. The processor may be further configured to retrieve an audience member corresponding to an external identifier of the user from an audience database stored on an electronic storage device. The processor may be further configured to assign the audience member to an event based on the data and a refresh interval of an audience segment. The processor may be further configured to refresh the audience segment. The processor may be further configured to synchronize the event with an external advertising platform.

A tangible, non-transient, computer-readable media may have instructions thereupon which when implemented by a processor may cause the processor to perform a method comprising receiving, at the processor, data from a remote device, the data related to a user of the remote device. The method may further comprise retrieving an audience member corresponding to an external identifier of the user from an audience database stored on an electronic storage device. The method may further comprise assigning the audience member to an event based on the data and a refresh interval of an audience segment. The method may further comprise refreshing the audience segment. The method may further comprise synchronizing the event with an external advertising platform.

The data may include behavioral data. The data may include data received from a tracking pixel, from an external server, or from an external application. The data may be filtered by an event characteristic or a user trait. The data may be first-party data. The first-party data may be from the user's usage of a web resource, a tracking pixel, from an external server, or from an external application (e.g., a customer relationship management system (CRM), a billing system, a point-of-sale system (POS), or another server). The user's usage of the web resource may be on the remote device.

The event may be an inclusion event. The event may be an exclusion event. The event may be created for the audience member after the audience member is included or excluded from the audience segment. The audience member may be included or excluded from the audience segment based on the data. The audience member may be additionally or alternately included or excluded from the audience segment based on one or more parameters of the audience segment. The inclusion or exclusion event may contain a segment identifier which may be a segment name, a segment ID, or any other parameter which identifies that particular audience segment.

The synchronization may be at a predefined interval. The synchronization may be based on a trigger. The synchronization may include pushing the event to the external advertising platform. The pushing may be via an inclusion event or an exclusion event, which may be used to create one or more custom audiences in the external advertising platform.

An identity of the user may be resolved. The user may be anonymous. The identity of the user may comprise one or more identification parameters assigned to the user. The user may be an anonymous user. The user may be a known user.

The event may have an audience segment name. The event may have an audience segment identifier.

Dynamic advertising information may be sent to the external advertising platform. The dynamic advertising information may include a product identifier. The dynamic advertising information may include product data. The dynamic advertising information may include a content identifier. The dynamic advertising information may include content data.

BRIEF DESCRIPTION OF THE FIGURES

For a fuller understanding of the nature and objects of the disclosure, reference should be made to the following detailed description taken in conjunction with the accompanying drawings, in which.

DETAILED DESCRIPTION

It is to be understood that the invention is not limited in its application to the details of construction and the arrangements of components and/or method steps set forth in the following description or illustrated in the drawings, and phraseology and terminology used herein is for the purpose of description and should not be regarded as limiting. The invention is capable of other embodiments and of being practiced or being carried out in various ways. Accordingly, other aspects, advantages, and modifications will be apparent to those skilled in the art to which the invention pertains, and these aspects and modifications are within the scope of the invention, which is limited only by the appended claims.

Conventional advertising strategies systems may present a host of deficiencies and inefficiencies to advertisers (e.g., advertisers, marketers, businesses, individuals, etc.). Using such conventional systems, such advertisers may be unable to, for example, sync first-party anonymous user behavioral data to external advertising platforms. This may be due to, for example, an unavailability of individual identifiers such as a user's name, email, mobile number, or other identifier. Furthermore, advertisers may need to upload a list of customers by inputting (e.g., feeding) individual identifiers into an external advertising platform for retargeting or remarketing advertising campaigns. This may include a cumbersome and manual process, for example, various exporting and importing of data. This may be, for example, because these required identifiers may not be available for all customers in the list. This may yield a lower match rate with the audience in the advertising platform. For these and other reasons, conventional methods, strategies, and systems for advertising may present inefficiencies, omissions, and opportunity for errors or other inaccuracies.

Embodiments disclosed herein may include methods, systems, and apparatuses for creation of audience segments in advertising platforms. In some embodiments, when an anonymous user (e.g., a customer) visits a web application (e.g., a website, a native application, or a virtualized hosted application) the user may be identified using a set of parameters and behavioral data may be collected relating to the user. Advertisers may be able to utilize this behavioral data to segment an audience by filtering the events data of the users. This events data may be identified by unique segment name and identifier in a platform according to various embodiments. This events data may further be used by advertisers to retarget the users based on their behavior, which may be grouped within a segment.

Embodiments may use first-party data from, for example, websites to generate custom audience segments. Each user (e.g., client, customer, prospective customer, lead, past customer, etc.) may be assigned to, for example, an inclusion or an exclusion event based on a refresh interval given for an audience segment, which may be identified by unique identifier or name. Such audience segments may be synchronized at predefined intervals, or when triggered, with one or more external advertising platforms. An aspect may be an audience segmentation engine (including a user interface and via code and an application programming interface (API)), which may be configured to define an audience segment by fixing a refresh interval, which may provide for syncing the users with the external advertising platform.

Yet another aspect may include creation of events for users (e.g., when added or removed from a segment), which may include automatically syncing users (e.g., anonymous users) from an audience segment along with segment identification parameters based on such events.

Yet another aspect may include an identity resolution engine, which may identify anonymous users by, for example, unique identification parameters assigned to such users. This may assist in matching the data with advertising platforms.

Yet another aspect may include pushing events to external advertising platforms, which may include creating or updating custom audience(s) in advertising platforms by pushing the events created in the application server directly without feeding in the individual data.

Using the identifying parameters, for example, a segment name or segment identifier, a custom audience segment may be created in an external advertising platform by feeding in the event name or other identifier that is unique to the audience segment that has been created in the advertising audience segment creator. Anonymous users may be automatically added to a segment or removed from a segment based on a refresh rate of each segment, which, in turn, may increase the match rate because of the one or more unique identifying parameters assigned to the user. In this way, advertisers may be able to target a specific set of users without undergoing the manual process of entering the details in the external advertising platform, which would otherwise result in a lower match rate.

Various components of embodiments herein may include an audience segmentation aspect, an event creation aspect, an identity resolution aspect, and an event pushing aspect. The audience segmentation aspect may be used to create a segment of an audience by, for example, fixing a refresh interval. This may enable the audience segmentation engine to synchronize the users with the external advertising platform. The event creation module may provide for the automatic adding or removal of anonymous users from an advertising segment based on given events. Such anonymous users may further be included with or excluded from certain segment identification parameters based on given events. The identity resolution aspect may provide for the identification of anonymous users using unique identification parameters assigned to them. This may assist with data matching on external advertising platforms. The event pushing aspect may provide for creating a custom audience in an external advertising platform by, for example, pushing the events created in a platform according to an embodiment herein directly to the external advertising platform without the need to input or import individual data separately into the separate advertising platform.

Each user may be assigned to either inclusion or exclusion event based on a refresh interval given for a segment. The segment may be identified by, for example, a unique identifier or name. The event may be named as required for retargeting or targeting (e.g., "view content," "add to cart," or "added to segment"). Since each user is identified using unique parameters, dynamic advertising information may also be provided to the external advertising platform via events. Using the event name, segment name, or identifier, as well as users identification parameters, data may be populated in an application server in accordance with an embodiment herein, and synchronized with an advertising platform. External advertising platforms may then utilize these parameters to assign that event to the specific user.

Figure 1:
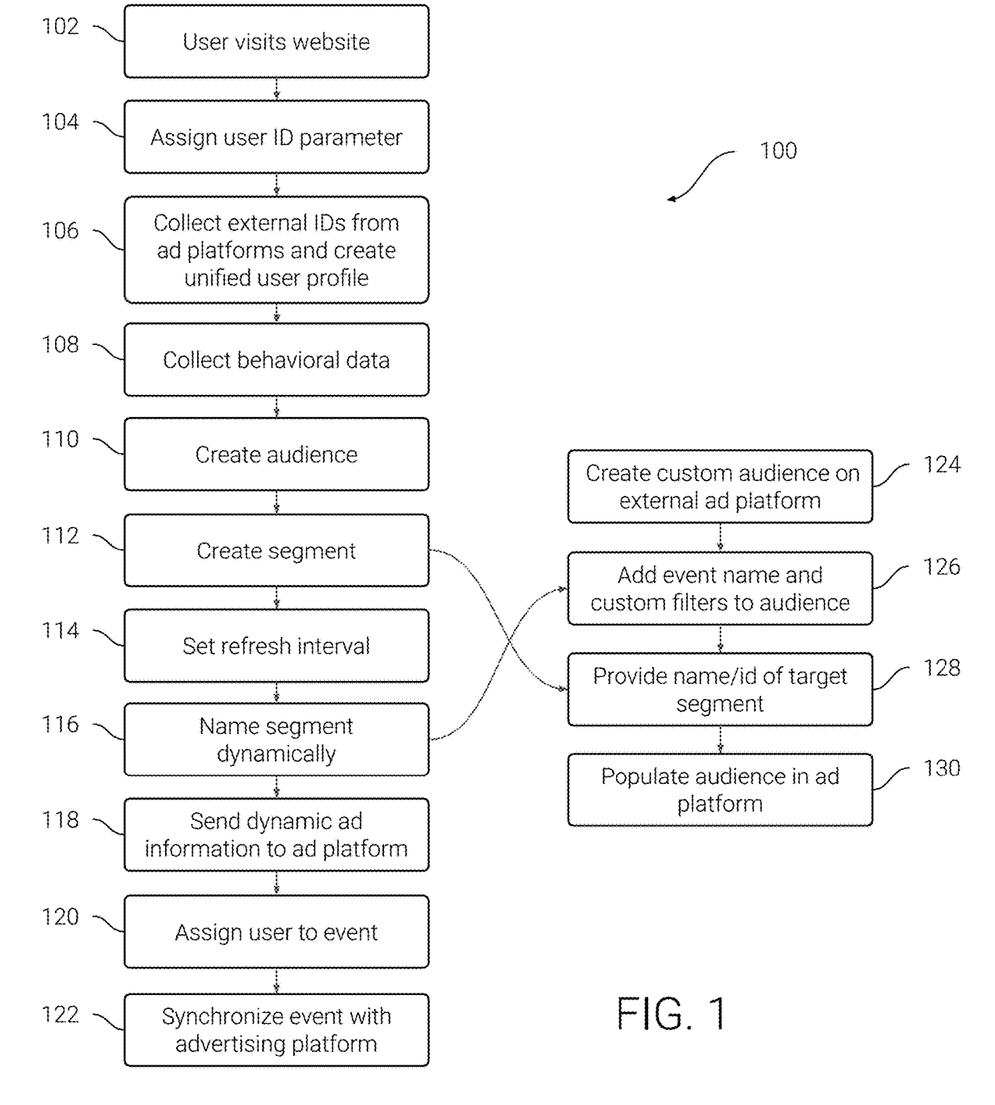
FIG. 1 illustrates a method for creation of audience segments in advertising platforms, according to an embodiment.

FIG. 1 illustrates a method 100 for creation of audience segments in advertising platforms, according to an embodiment.

At 102, a user may visit a website. At 104, the user may be assigned a unique identification parameter. This unique identification parameter may be considered an internal identifier. This internal identifier may utilize a pixel code (e.g., a tracking pixel identifier), which may be recognizable by and across various external advertising platforms. This may enable collecting information about a user's behavior via, for example, a tracking pixel, from an external server, or from an external application At 106, external identifiers may be collected from the external advertising platforms and a unified user profile may be created. At 108, behavioral data of the users may be collected under appropriate event names.

At 110, an audience may be created in a platform running on an application server according to an embodiment, for example, by grouping the events under a segment based on the requirements of the advertiser. At 112, a segment may be identified by a unique name or identifier. At 114, a refresh interval may be set. The refresh interval may be set based on predetermined parameters, for example as decided by an advertiser. The refresh interval may be set for each segment to add or remove users from a given segment.

At 116, the segment may be dynamically named. For example, an advertiser may dynamically name a segment as suitable for an event. (e.g., "view content," "add to cart," "viewed product in 7 days", "not purchased in 30 days", "or added to segment"). At 118, dynamic advertising information may be sent to an external advertising platform. Dynamic advertising information may include, for example, product, service, or content data. At 120, each user may be assigned to either an exclusion or inclusion event using, for example, the identification parameters. At 122, content or data from the platform may be synchronized with the external advertising platform. This synchronization may be accomplished, for example, using the event name or other identifier and each user's unique identification parameters.

At 124, a custom audience may be pushed to (e.g., created on) the external advertising platform. At 126, an event name and custom filters may be used to populate the audience or audience segment on the external advertising platform. The event name may be the event name designated at 116. At 128, a name or identifier of the audience segment may be provided to be targeted in the filter. The attributes may be of the segment created at 112. At 130, the audience in the external advertising platform may be populated.

In an embodiment, any of 102-130 may be performed at an application server or an external advertising platform. In an example, 102-122 may be performed at an application server and 124-130 may be performed at an external advertising platform. Communication between the application server and the external marketing platform may be via, for example, the internet (e.g., via an application programming interface (API)).

Figure 2:
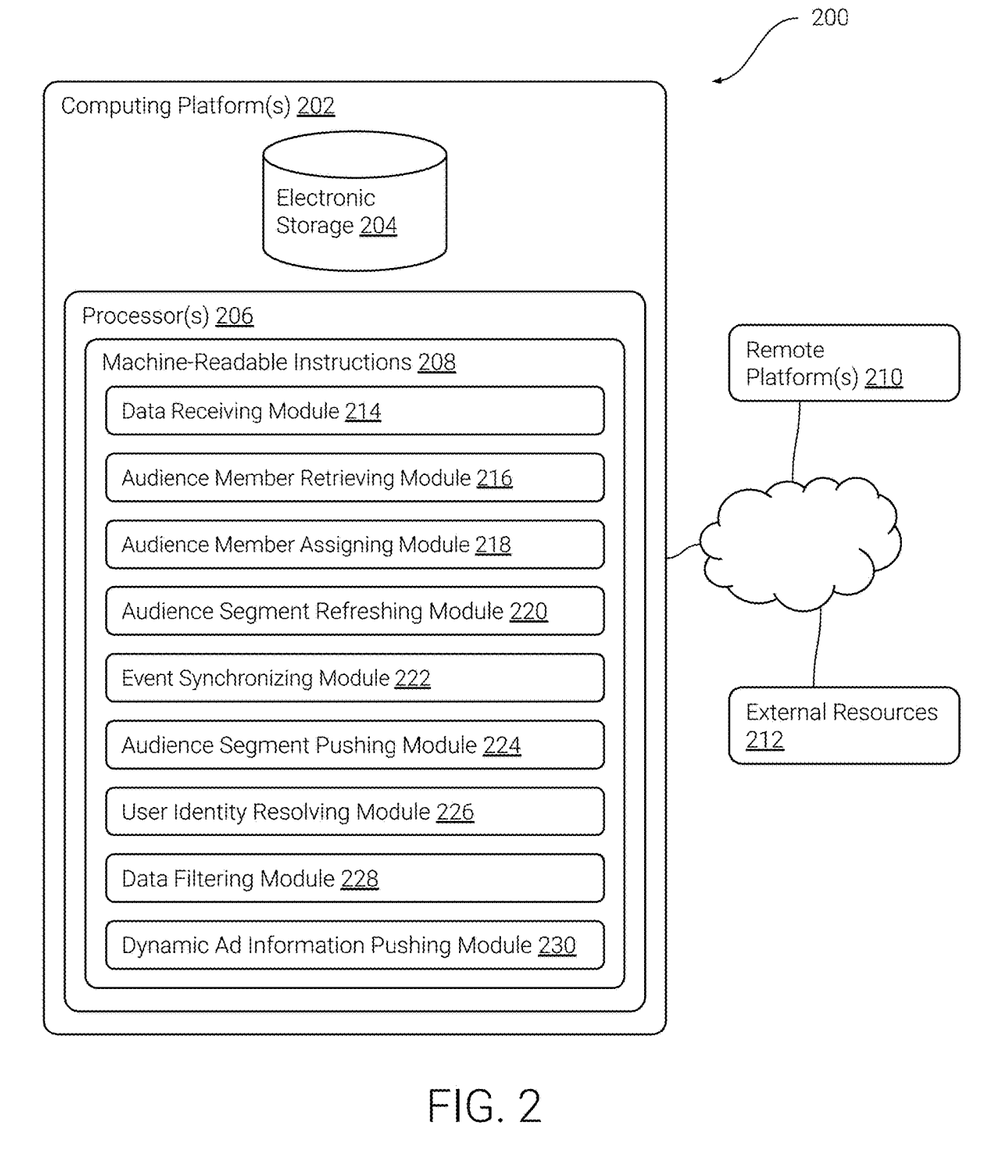
FIG. 2 illustrates a system for creation of audience segments in advertising platforms, according to an embodiment.

FIG. 2 illustrates a system 200 for creation of audience segments in advertising platforms, according to an embodiment. In some embodiments, system 200 may include one or more computing platforms 202. Computing platform(s) 202 may be configured to communicate with one or more remote platforms 210 according to a client/server architecture, a peer-to-peer architecture, and/or other architectures. Remote platform(s) 210 may be configured to communicate with other remote platforms via computing platform(s) 202 and/or according to a client/server architecture, a peer-to-peer architecture, and/or other architectures. Users may access system 200 via remote platform(s) 210.

In some embodiments, computing platform(s) 202, remote platform(s) 210, and/or external resources 212 may be operatively linked via one or more electronic communication links. For example, such electronic communication links may be established, at least in part, via a network such as the internet and/or other networks using, for example, TCP/IP or cellular hardware enabling wired or wireless communication. It will be appreciated that this is not intended to be limiting, and that the scope of this disclosure includes embodiments in which computing platform(s) 202, remote platform(s) 210, and/or external resources 212 may be operatively linked via some other communication media.

The internet may include an interconnected network of systems and a suite of protocols for the end-to-end transfer of data therebetween. A model describing may be the Transport Control Protocol and Internet Protocol (TCP/IP), which may also be referred to as the internet protocol suite. TCP/IP provides a model of four layers of abstraction: an application layer, a transport layer, an internet layer, and a link layer. The link layer may include hosts accessible without traversing a router, and thus may be determined by the configuration of the network (e.g., a hardware network implementation, a local area network, a virtual private network, or a networking tunnel). The link layer may be used to move packets of data between the internet layer interfaces of different hosts on the same link. The link layer may interface with hardware for end-to-end transmission of data. The internet layer may include the exchange of datagrams across network boundaries (e.g., from a source network to a destination network), which may be referred to as routing, and is performed using host addressing and identification over an internet protocol (IP) addressing system (e.g., IPv4, IPv6). A datagram may include a self-contained, independent, basic unit of data, including a header (e.g., including a source address, a destination address, and a type) and a payload (e.g., the data to be transported), to be transferred across a packet-switched network. The transport layer may utilize the user datagram protocol (UDP) to provide for basic data channels (e.g., via network ports) usable by applications for data exchange by establishing end-to-end, host-to-host connectivity independent of any underlying network or structure of user data. The application layer may include various user and support protocols used by applications users may use to create and exchange data, utilize services, or provide services over network connections established by the lower layers, including, for example, routing protocols, the hypertext transfer protocol (HTTP), the file transfer protocol (FTP), the simple mail transfer protocol (SMTP), and the dynamic host configuration protocol (DHCP). Such data creation and exchange in the application layer may utilize, for example, a client-server model or a peer-to-peer networking model. Data from the application layer may be encapsulated into UDP datagrams or TCP streams for interfacing with the transport layer, which may then effectuate data transfer via the lower layers.

A given remote platform 210 may include one or more processors configured to execute computer program modules. The computer program modules may be configured to enable an expert or user associated with the given remote platform 210 to interface with system 200 and/or external resources 212, and/or provide other functionality attributed herein to remote platform(s) 210. By way of non-limiting example, a given remote platform 210 and/or a given computing platform 202 may include one or more of a server, a desktop computer, a laptop computer, a handheld computer, a tablet computing platform, a Netbook, a Smartphone, a gaming console, and/or other computing platforms.

External resources 212 may include sources of information outside of system 200, external entities participating with system 200, and/or other resources. In some embodiments, some or all of the functionality attributed herein to external resources 212 may be provided by resources included in system 200.

Computing platform(s) 202 may include electronic storage 204, one or more processors 206, and/or other components. Computing platform(s) 202 may include communication lines, or ports to enable the exchange of information with a network and/or other computing platforms. Illustration of computing platform(s) 202 in FIG. 2 is not intended to be limiting. Computing platform(s) 202 may include a plurality of hardware, software, and/or firmware components operating together to provide the functionality attributed herein to computing platform(s) 202. For example, computing platform(s) 202 may be implemented by a cloud of computing platforms operating together as computing platform(s) 202.

Electronic storage 204 may comprise non-transitory storage media that electronically stores information. The electronic storage media of electronic storage 204 may include one or both of system storage that is provided integrally (i.e., substantially non-removable) with computing platform(s) 202 and/or removable storage that is removably connectable to computing platform(s) 202 via, for example, a port (e.g., a USB port, an IEEE 1394 port, a THUNDERBOLT™ port, etc.) or a drive (e.g., a disk drive, etc.). Electronic storage 204 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 204 may include one or more virtual storage resources (e.g., cloud storage, a virtual private network, and/or other virtual storage resources). Electronic storage 204 may store software algorithms, information determined by processor(s) 206, information received from computing platform(s) 202, information received from remote platform(s) 210, and/or other information that enables computing platform(s) 202 to function as described herein.

Processor(s) 206 may be configured to provide information processing capabilities in computing platform(s) 202. As such, processor(s) 206 may include one or more of a digital processor, an analog processor, a digital circuit designed to process information, an analog circuit designed to process information, a state machine, and/or other mechanisms for electronically processing information. Although processor(s) 206 is shown in FIG. 2 as a single entity, this is for illustrative purposes only. In some embodiments, processor(s) 206 may include a plurality of processing units. These processing units may be physically located within the same device, or processor(s) 206 may represent processing functionality of a plurality of devices operating in coordination. Processor(s) 206 may be configured to execute one or more of the modules disclosed herein, and/or other modules. Processor(s) 206 may be configured to execute one or more of the modules disclosed herein, and/or other modules by software; hardware; firmware; some combination of software, hardware, and/or firmware; and/or other mechanisms for configuring processing capabilities on processor(s) 206. As used herein, the term "module" may refer to any component or set of components that perform the functionality attributed to the module. This may include one or more physical processors during execution of processor readable instructions, the processor readable instructions, circuitry, hardware, storage media, or any other components. Various modules or portions thereof may be implemented in any of various ways, including procedure-based techniques, component-based techniques, and/or object-oriented techniques, among others. For example, the program instructions may be implemented using ActiveX controls, model-view-controller (MVC) principles, application programming interfaces (APIs), system-specific programming languages and principles, cross-platform programming languages and principles, pre-compiled programming languages, "byte-code" programming languages, object-oriented programming principles or languages, other programming principles or languages, JavaBeans, Microsoft Foundation Classes (MFC), Streaming SIMD Extension (SSE), or other technologies or methodologies, as desired.

It should be appreciated that although the modules disclosed herein are illustrated in FIG. 2 as being implemented within a single processing unit, in embodiments in which processor(s) 206 includes multiple processing units, one or more of modules disclosed herein may be implemented remotely from the other modules. The description of the functionality provided by the different modules disclosed herein is for illustrative purposes, and is not intended to be limiting, as any of modules described herein may provide more or less functionality than is described. For example, one or more of modules disclosed herein may be eliminated, and some or all of its functionality may be provided by other ones of modules disclosed herein. As another example, processor(s) 206 may be configured to execute one or more additional modules that may perform some or all of the functionality attributed herein to one of modules disclosed herein.

Computing platform(s) 202 may be configured by machine-readable instructions 208. Machine-readable instructions 208 may include one or more instruction modules. The instruction modules may include computer program modules. The instruction modules may include one or more of the modules disclosed herein and/or other instruction modules.

A data receiving module 214 may be configured to receive data at a processor of an application server from a remote device. The data may be related to a user of the remote device. The data may include behavioral data. The data may include data received from a tracking pixel, from an external server, or from an external application (e.g., a customer relationship management system (CRM), a billing system, a point-of-sale system (POS), or another server). The data may be filtered by an event characteristic. The data may be first-party data. The first-party data may be from the user's usage of a web resource or another application. The user's usage of the web resource may be on the remote device.

An audience member retrieving module 216 may be configured to retrieve an audience member. The audience member may correspond to an external identifier of the user. The audience member may be retrieved from an audience database. The audience database may be stored on an electronic storage device.

An audience member assigning module 218 may be configured to assign an audience member to an event. The assigning of the audience member to the event may be based on the data. The assignment of the audience member to the event may be based on a refresh interval. The refresh interval may be of an audience segment. The event may be of an inclusion event or an exclusion event. An event may include, for example, the user viewing a content, the user adding a product to a shopping cart; or the user having been added to an audience segment. Inclusion and exclusion events may be defined by parameters set by the client, for example, while creating the segment. The event may be created for the audience member after the audience member is included or excluded from the audience segment. The audience member may be included or excluded from the audience segment based on the data. The audience member may be additionally or alternately included or excluded from the audience segment based on a parameter of the audience segment. Operation 306 may be performed by one or more hardware processors configured by machine-readable instructions including a module in accordance with one or more embodiments.

An audience segment refreshing module 220 may be configured to refresh the audience segment. An inclusion or an exclusion event may be created for the users in the segment. The event may be synchronized with an external advertising platform. The event may have an audience segment name. The event may have an audience segment identifier.

An event synchronizing module 222 may be configured to (e.g., along with an event name or a segment name) with an external advertising platform. The synchronization may be at a predefined interval. The synchronization may be based on a trigger. The trigger may be based on, for example, a manual condition or an event. The synchronization may include pushing the event to the external advertising platform.

An audience segment pushing module 224 may be configured to push (e.g., send) the event to an external advertising platform. The pushing may be via an inclusion event or an exclusion event, which may be used to create a custom audience in the external advertising platform.

A user identity resolving module 226 may be configured to resolve an identity of the user. The user may be anonymous. An identity resolution database may be hosted on the application server (e.g., on the electronic storage device) or an external resource. The identity of the user may comprise one or more unique identification parameters assigned to the user. The user may be an anonymous user. The user may be a known user.

A data filtering module 228 may be configured to provide instructions or other information to an external advertising platform to filter an audience based upon, for example, an exclusion or inclusion event, an event characteristic, or a user trait.

A dynamic advertising information pushing module 230 may be configured to push (e.g., send) dynamic advertising information to the external advertising platform. The dynamic advertising information may include a product identifier. The dynamic advertising information may include product data. The dynamic advertising information may include a content identifier. The dynamic advertising information may include content data.

Various steps, functions, and/or operations of computing platform(s) 202, remote platform(s) 210, and/or external resources 212 and the methods disclosed herein may be carried out by one or more of, for example, electronic circuits, logic gates, multiplexers, programmable logic devices, ASICs, analog or digital controls/switches, microcontrollers, or computing systems. Program instructions implementing methods such as those described herein may be transmitted over or stored on carrier medium. The carrier medium may include a storage medium such as a read-only memory, a random-access memory, a magnetic or optical disk, a non-volatile memory, a solid-state memory, a magnetic tape, and the like. A carrier medium may include a transmission medium such as a wire, cable, or wireless transmission link. For instance, the various steps described throughout the present disclosure may be carried out by a single processor 206 (or computing platform 202) or, alternatively, multiple processors 206 (or multiple computing platforms 202). Moreover, different sub-systems of system 200 may include one or more computing or logic systems. Therefore, the description herein should not be interpreted as a limitation on the present disclosure but merely an illustration.

Figure 3:
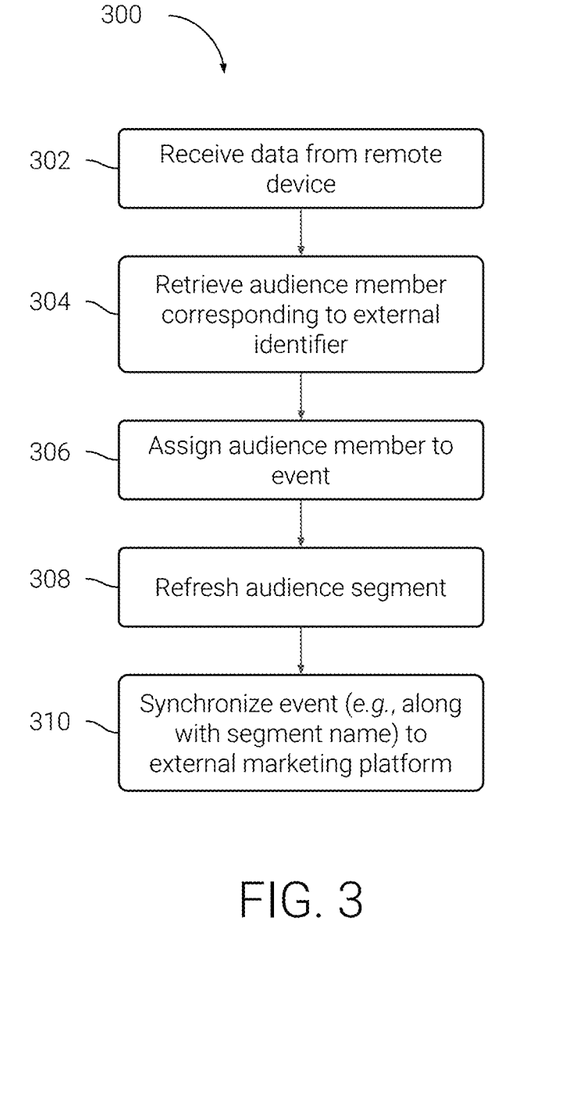
FIG. 3 illustrates a method for creation of audience segments in advertising platforms, according to an embodiment.

FIG. 3 illustrates a method 300 for creation of audience segments in advertising platforms, according to an embodiment. The operations of method 300 presented herein are intended to be illustrative. In some embodiments, method 300 may be accomplished with one or more additional operations not described, and/or without one or more of the operations discussed. Additionally, the order in which the operations of method 300 are illustrated in FIG. 3 and described herein is not intended to be limiting.

An operation 302 may include receiving data at a processor of an application server from a remote device. The data may be related to a user of the remote device. The data may include behavioral data. The data may include data received from a tracking pixel. The data may be filtered by an event characteristic. The data may be first-party data. The first-party data may be from the user's usage of a web resource, such as, for example, a tracking pixel, from an external server, or from an external application (e.g., a customer relationship management system (CRM), a billing system, a point-of-sale system (POS), or another server). The user's usage of the web resource may be on the remote device. Operation 302 may be performed by one or more hardware processors configured by machine-readable instructions including a module in accordance with one or more embodiments.

An operation 304 may include retrieving an audience member. The audience member may correspond to an external identifier of the user. The audience member may be retrieved from an audience database. The audience database may be stored on an electronic storage device. Operation 304 may be performed by one or more hardware processors configured by machine-readable instructions including a module in accordance with one or more embodiments.

An operation 306 may include assigning an audience member to an event. The assigning of the audience member to the event may be based on the data. The assignment of the audience member to the event may be based on a refresh interval. The refresh interval may be of an audience segment. The event may be an inclusion event or an exclusion event. An event may include, for example, the user viewing a content, the user adding a product to a shopping cart; or the user having been added to an audience segment. Inclusion and exclusion events may be defined by parameters set by the client, for example, while creating the segment. The event may be created for the audience member after the audience member is included or excluded from the audience segment. The audience member may be included or excluded from the audience segment based on the data. The audience member may be additionally or alternately included or excluded from the audience segment based on a parameter of the audience segment. Operation 306 may be performed by one or more hardware processors configured by machine-readable instructions including a module in accordance with one or more embodiments.

An operation 308 may include refreshing the audience segment. The event may be synchronized with an external advertising platform. The event may have an audience segment name. The event may have an audience segment identifier. Operation 308 may be performed by one or more hardware processors configured by machine-readable instructions including a module in accordance with one or more embodiments.

An operation 310 may include synchronizing the event with an external advertising platform. The synchronization may be at a predefined interval. The synchronization may be based on a trigger. The trigger may be based on, for example, a manual condition or an event. The synchronization may include pushing the event to the external advertising platform. The pushing may be via an inclusion event or an exclusion event, which may create a custom audience in the external advertising platform. Operation 310 may be performed by one or more hardware processors configured by machine-readable instructions including a module in accordance with one or more embodiments.

A further operation may include resolving an identity of the user. The user may be anonymous. An identity resolution database may be hosted on the application server (e.g., on the electronic storage device) or an external resource. The identity of the user may comprise one or more unique identification parameters assigned to the user. The user may be an anonymous user. The user may be a known user.

A further operation may include sending dynamic advertising information to the external advertising platform. The dynamic advertising information may include a product identifier. The dynamic advertising information may include product data. The dynamic advertising information may include a content identifier. The dynamic advertising information may include content data.

In some embodiments, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/ or software to be specifically designed for execution of one or more of the operations of method 300.

Figure 4:
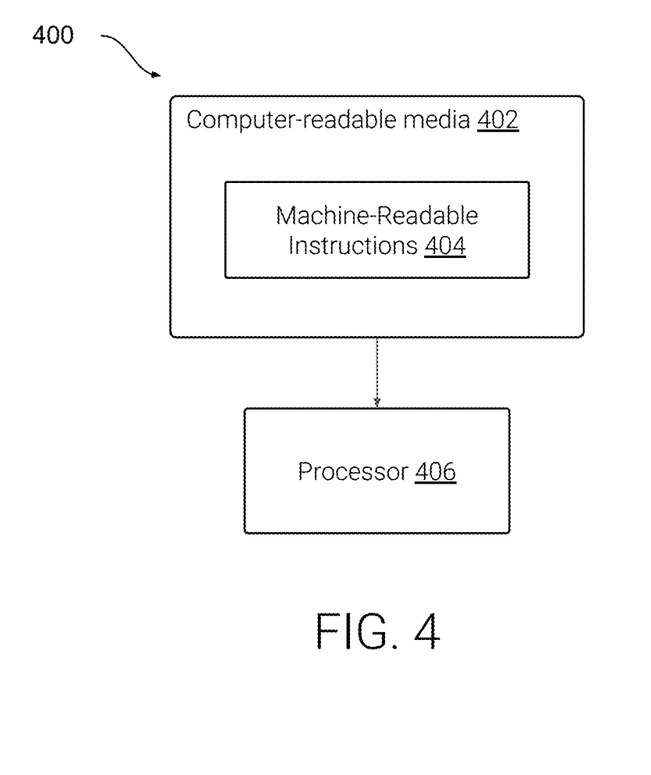
FIG. 4 illustrates an apparatus for creation of audience segments in advertising platforms, according to an embodiment.

FIG. 4 illustrates an apparatus 400 for creation of audience segments in advertising platforms, according to an embodiment. The apparatus may include a tangible, non-transient, computer-readable (e.g., machine-readable) media 402, which may have instructions 404 thereupon which when implemented by a processor 406 may cause processor 406 to perform a method. The method may comprise receiving, at the processor, data from a remote device, the data related to a user of the remote device. The method may further comprise retrieving an audience member corresponding to an external identifier of the user from an audience database stored on an electronic storage device. The method may further comprise assigning the audience member to an event based on the data and a refresh interval of an audience segment. The method may further comprise refreshing the audience segment. The method may further comprise synchronizing the event with an external advertising platform. The method may be, for example, similar to method 300.

Figure 5:
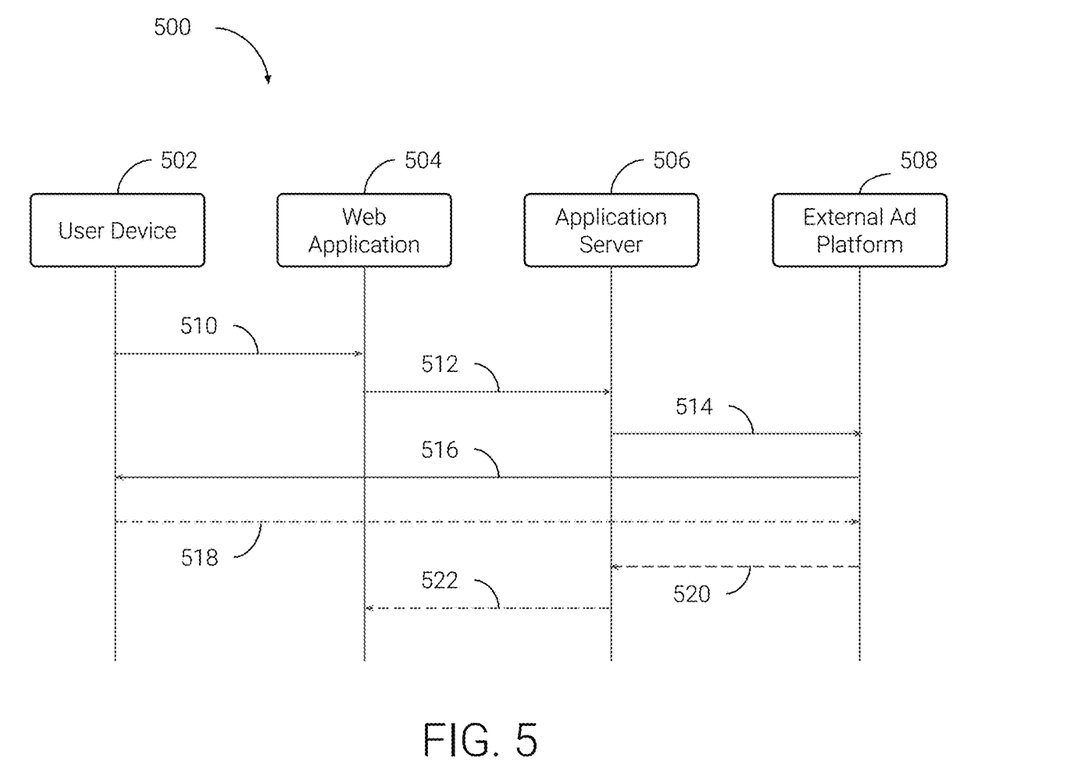
FIG. 5 illustrates a sequence diagram for creation of audience segments in advertising platforms, according to an embodiment.

FIG. 5 illustrates a sequence diagram 500 for creation of audience segments in advertising platforms, according to an embodiment. A sequence diagram represents a sequence of actions that takes place among a set of actors over time. Time begins at the top of the diagram and advances toward the bottom. A sequence diagram contains a possible sequence of events, and is thus not complete in that sense.

Sequence diagram 500 may depict a progression in time of an operation of an embodiment. It will be understood that the particular sequence of events shown in sequence diagram 500 is not a limitation on the present disclosure. For example, various embodiments may be incorporated into different sequences without departing from the present disclosure.

In sequence diagram 500, events (e.g., requests, responses, and other transmissions of data) may be illustrated between actors including user device 502, a web application 504, an application server 506, and an external advertising platform 508. The actors may communicate with each other, for example, via the internet. In various embodiments, such events may be, for example, synchronous or asynchronous regardless of the particular illustration thereof provided by sequence diagram 500. For example, in an embodiment, a given request may be an asynchronous request and in another embodiment, the given request may be synchronous.

User device 502 may initiate a request 510 to web application 504. Web application 504 may return data to user device 502 (not pictured). With the interaction of user device 502 with web application 504 there may be asynchronous or synchronous communications. Sequence diagram 500 includes merely one example of a sequence of events. Web application 504 may provide data in a request 512 to application server 506. Application server 506 may perform actions according to various embodiments herein to create audiences or audience segments based on users, be they known or anonymous of user devices such as user device 502. At least a portion of the data associated with request 512 may include behavioral data relating to user device 502's (and thus, the user's) interactions with web application 504.

Once an audience or audience segment is formed at application server 506, application server 506 may push, at 514, the event or audience to external advertising platform 508. The information pushed by application 506 at 514 may include, for example, a segment identifier, a user identifier, or other data relevant to populating an audience segment on external advertising platform 508 or filtering the same.

After the information is populated on external advertising platform 508, external advertising platform 508 may at 516 serve an advertisement to user device 502. User device 502 may be configured to receive, display, play, or otherwise present to a user of user device 502 the advertisement information provided at 518 or a representation thereof. At 518, user device 502 may provide to external advertising platform 508 various data regarding a served advertisement, or other metrics, or information relating to tracking. External advertising platform 508 may process the information returned at 518. At 520, external ad platform 508 may return processed or unprocessed information to application server 506. Application server 506 may then perform additional processing of the data and in some embodiments return the same to web application 504 at 522.

Embodiments herein may provide advantages over conventional art to advertisers including, for example, a reduction in quantity of data entry, a reduction in chance of error (e.g., related to incorrect data received or incorrect data entered). Additional advantages may include faster and more timely execution of advertising strategies by advertisers. Such embodiments may further eliminate the need for additional layers of data processing and may provide for a more direct interface between a web application and the advertiser operating the same and an advertising platform. This may enable the use of first party data to produce and populate audiences and audience segments on advertising platforms, rather than relying on third party data or inaccurate anecdotal data. Thus, accuracy and efficiency of systems for executing targeting or retargeting advertising strategies may be achieved.

Various characteristics, advantages, embodiments, and/or examples relating to the invention have been described in the foregoing description with reference to the accompanying drawings. However, the above description and drawings are illustrative only. The invention is not limited to the illustrated embodiments and/or examples, and all embodiments and/or examples of the invention need not necessarily achieve every advantage or purpose, or possess every characteristic, identified herein. Accordingly, various changes, modifications, or omissions may be effected by one skilled in the art without departing from the scope or spirit of the invention, which is limited only by the appended claims. Although example materials and dimensions have been provided, the invention is not limited to such materials or dimensions unless specifically required by the language of a claim. Elements and uses of the above-described embodiments and/or examples can be rearranged and combined in manners other than specifically described above, with any and all permutations within the scope of the invention, as limited only by the appended claims.

In the claims, various portions are prefaced with letter or number references for convenience. However, use of such references does not imply a temporal or ordered relationship not otherwise required by the language of the claims. Unless the phrase 'means for' or 'step for' appears in a particular claim or claim limitation, such claim or claim limitation should not be interpreted to invoke 35 U.S.C. § 112(f).

As used in the specification and in the claims, use of "and" to join elements in a list forms a group of all elements of the list. For example, a list described as comprising A, B, and C defines a list that includes A, includes B, and includes C. As used in the specification and in the claims, use of "or" to join elements in a list forms a group of at least one element of the list. For example, a list described as comprising A, B, or C defines a list that may include A, may include B, may include C, may include any subset of A, B, and C, or may include A, B, and C. Unless otherwise stated, lists herein are inclusive, that is, lists are not limited to the stated elements and may be combined with other elements not specifically stated in a list. As used in the specification and in the claims, the singular form of 'a', 'an', and 'the' include plural referents (e.g., one or more of the referent) unless the context clearly dictates otherwise.

It is to be expressly understood that the drawings are for the purpose of illustration and description only and are not intended as a definition of the limits of the invention.

Unless otherwise stated, any range of values disclosed herein sets out a lower limit value and an upper limit value, and such ranges include all values and ranges between and including the limit values of the stated range, and all values and ranges substantially within the stated range as defined by the order of magnitude of the stated range.

The inventors hereby state their intent to rely on the Doctrine of Equivalents to determine and assess the reasonably fair scope of their invention as pertains to any apparatus not materially departing from but outside the literal scope of the invention as set out in the following claims.

I claim:

1. A method, comprising: receiving, at a processor of an application server, behavioral data from a remote device in electronic communication with the processor, the behavioral data related to a use by a user of the remote device of a website served to the remote device; automatically retrieving, using the processor, a unified user profile of an audience member from an audience database stored on an electronic storage device in electronic communication with the processor, wherein: the unified user profile includes an external identifier retrieved from an external advertising platform in electronic communication with the processor, wherein the external advertising platform is configured to serve an advertisement to an external advertising platform user corresponding to the external identifier; automatically assigning, using the processor, the audience member to an event based on the behavioral data and a refresh interval of an audience segment, wherein the event is an inclusion event or an exclusion event; automatically refreshing, using the processor, the audience segment; and automatically synchronizing the event with the external advertising platform, comprising: automatically creating, using the processor, a processable audience update instruction including a segment operation and dynamic advertising information including a content identifier and content data, wherein the audience update instruction is processable by the external advertising platform: wherein the segment operation is configured to cause, when processed by the external advertising platform, the external advertising platform to: search for an external advertising platform audience segment corresponding to the event; if the external advertising platform audience segment corresponding to the event does not exist in the external advertising platform, create the external advertising platform audience segment corresponding to the event: update the external advertising platform audience segment corresponding to the event of the external advertising platform by: if the event is an inclusion event, adding the audience member to the external advertising platform audience segment: or if the event is an exclusion event, removing the audience member from the external advertising platform audience segment; sending, using the processor, the processable audience update instruction to the external advertising platform; and receiving, at the processor, from the external advertising platform, return data including a hypertext transfer protocol response indicating the external advertising platform received the processable audience update instruction.

2. The method of claim 1, wherein the behavioral data includes data received from a tracking pixel, an external server, or an external application.

3. The method of claim 1, further comprising filtering, using the processor, the behavioral data by an event characteristic or a user trait.

4. The method of claim 1, wherein the behavioral data is first-party data from the user's usage of a web resource or external data from another application or server on the remote device.

5. The method of claim 1, wherein the event is created for the audience member after the audience member is included or excluded from the audience segment based on the behavioral data and a parameter of the audience segment.

6. The method of claim 1, wherein the synchronization is at a predefined interval.

7. The method of claim 1, wherein the synchronization is based on a trigger.

8. The method of claim 1, further comprising resolving, using the processor, an identity of the user, wherein the user is an anonymous user or a known user.

9. The method of claim 8, wherein the identity of the user comprises a unique identification parameter assigned to the user.

10. The method of claim 1, wherein the user is an anonymous user or a known user.

11. The method of claim 1, wherein event has an audience segment name and an audience segment identifier.

12. The method of claim 1, wherein the content data includes:
   a product identifier; and
   product data.

13. A system, comprising: a processor of an application server; and an electronic storage device in electronic communication with the processor, the electronic storage device having an audience database stored thereon; wherein the processor is configured to: receive behavioral data from a remote device in electronic communication with the processor, the behavioral data related to a use by a user of the remote device of a website served to the remote device; automatically retrieve a unified user profile of an audience member from the audience database, wherein: the unified user profile includes an external identifier retrieved from an external advertising platform in electronic communication with the processor wherein the external advertising platform is configured to serve an advertisement to an external advertising platform user corresponding to the external identifier; automatically assign the audience member to an event based on the behavioral data and a refresh interval of an audience segment, wherein the event is an inclusion event or an exclusion event; automatically refresh the audience segment; and automatically synchronize the event with the external advertising platform, comprising: automatically creating, using the processor, a processable audience update instruction including a segment operation and dynamic advertising information including a content identifier and content data, wherein the audience update instruction is processable by the external advertising platform; wherein the segment operation is configured to cause, when processed by the external advertising platform, the external advertising platform to: search for an external advertising platform audience segment corresponding to the event; if the external advertising platform audience segment corresponding to the event does not exist in the external advertising platform create the external advertising platform audience segment corresponding to the event; update the external advertising platform audience segment corresponding to the event of the external advertising platform by: if the event is an inclusion event, adding the audience member to the external advertising platform audience segment; or if the event is an exclusion event removing the audience member from the external advertising platform audience segment; sending, using the processor, the processable audience update instruction to the external advertising platform; and receiving, at the processor, from the external advertising platform, return data including a hypertext transfer protocol response indicating the external advertising platform received the processable audience update instruction.

14. The system of claim 13, further comprising resolving, using the processor, an identity of the user, wherein the user is an anonymous user or a known user.

15. A tangible, non-transient, computer-readable media having instructions thereupon which when implemented by a processor cause the processor to perform a method comprising: receiving, at the processor, behavioral data from a remote device in electronic communication with the processor, the behavioral data related to a use by a user of the remote device of a website served to the remote device; automatically retrieving a unified user profile of an audience member from an audience database stored on an electronic storage device in electronic communication with the processor, wherein: the unified user profile includes an external identifier retrieved from an external advertising platform in electronic communication with the processor, wherein the external advertising platform is configured to serve an advertisement to an external advertising platform user corresponding to the external identifier; automatically assigning the audience member to an event based on the behavioral data and a refresh interval of an audience segment wherein the event is an inclusion event or an exclusion event; automatically refreshing the audience segment; and automatically synchronizing the event with the external advertising platform, comprising: automatically creating, using the processor, a processable audience update instruction including a segment operation and dynamic advertising information including a content identifier and content data, wherein the audience update instruction is processable by the external advertising platform: wherein the segment operation is configured to cause, when processed by the external advertising platform, the external advertising platform to: search for an external advertising platform audience segment corresponding to the event; if the external advertising platform audience segment corresponding to the event does not exist in the external advertising platform, create the external advertising platform audience segment corresponding to the event: update the external advertising platform audience segment corresponding to the event of the external advertising platform by: if the event is an inclusion event, adding the audience member to the external advertising platform audience segment: or if the event is an exclusion event removing the audience member from the external advertising platform audience segment; sending, using the processor, the processable audience update instruction to the external advertising platform; and receiving, at the processor, from the external advertising platform, return data including a hypertext transfer protocol response indicating the external advertising platform received the processable audience update instruction.

16. The method of claim 1, wherein the return data includes tracking information.

17. The method of claim 1, wherein the synchronizing the event with the external advertising platform further comprises:
   receiving, at the processor, from the external advertising platform, return data including a hypertext transfer protocol response indicating the external advertising platform processed the processable audience update instruction.

* * * * *